(12) United States Patent
Shell et al.

(10) Patent No.: US 9,506,217 B2
(45) Date of Patent: Nov. 29, 2016

(54) LOADER TOOLBAR AND METHOD OF USE

(71) Applicants: Lon R. Shell, San Marcos, TX (US);
David K. Myers, Luling, TX (US);
John V. Gilliland, San Marcos, TX (US)

(72) Inventors: Lon R. Shell, San Marcos, TX (US);
David K. Myers, Luling, TX (US);
John V. Gilliland, San Marcos, TX (US)

( * ) Notice: Subject to any disclaimer, the term of this patent is extended or adjusted under 35 U.S.C. 154(b) by 94 days.

(21) Appl. No.: 14/578,962

(22) Filed: Dec. 22, 2014

(65) Prior Publication Data

US 2015/0225924 A1    Aug. 13, 2015

Related U.S. Application Data

(60) Provisional application No. 61/937,326, filed on Feb. 7, 2014.

(51) Int. Cl.
| | | |
|---|---|---|
| *E02F 3/96* | (2006.01) | |
| *E02F 3/36* | (2006.01) | |
| *A01B 59/06* | (2006.01) | |
| *A01D 87/12* | (2006.01) | |
| *A01G 23/06* | (2006.01) | |
| *E01H 5/12* | (2006.01) | |

(52) U.S. Cl.
CPC .............. *E02F 3/96* (2013.01); *A01B 59/064* (2013.01); *A01D 87/127* (2013.01); *A01G 23/062* (2013.01); *E02F 3/3686* (2013.01); *E01H 5/12* (2013.01); *Y10T 29/49826* (2015.01)

(58) Field of Classification Search
CPC ...... E02F 3/96; E02F 3/3686; A01B 59/064; A01D 87/127; A01G 23/062; E01H 5/12; Y10T 29/49826
See application file for complete search history.

(56) References Cited

U.S. PATENT DOCUMENTS

| | | | |
|---|---|---|---|
| 1,412,834 A | 8/1921 | Bleoo | |
| 1,420,106 A | 6/1922 | Irwin | |
| 4,215,496 A * | 8/1980 | Wehr | E01H 5/06 172/817 |
| 4,356,644 A | 11/1982 | Harkness | |
| 4,821,436 A * | 4/1989 | Slocum | E01H 5/063 172/811 |
| 4,962,598 A * | 10/1990 | Woolhiser | E01H 1/056 172/819 |
| 5,025,616 A | 6/1991 | Moss | |
| 5,054,989 A | 10/1991 | Fell | |
| 5,097,609 A | 3/1992 | Swaggert | |
| 5,114,299 A | 5/1992 | Roche | |
| 5,180,028 A | 1/1993 | Perrenoud, Jr. | |
| 5,180,142 A | 1/1993 | Nowlin | |
| 5,490,340 A | 2/1996 | Muncy | |

(Continued)

*Primary Examiner* — Jamie L McGowan
(74) *Attorney, Agent, or Firm* — Ira P. Domnitz; Ewing & Jones, PLLC (57) ABSTRACT

A loader toolbar that can be attached to loaders, skid steer or tractor front end loaders that are compliant with the standard industry interface. The loader toolbar is designed to be a platform from which an array of agriculture and construction tools can easily and quickly be attached. The tools are pinned to the tool bar and can be installed or removed in minutes. The tool bar is designed to take advantage of the mechanical leverage of a fulcrum or pivot point for those tools such a tree extractor when prying or pulling tree by its roots. The loaded toolbar does not rely entirely on the hydraulics of the skid steer. The non-reliance on hydraulics, combined with the inherent maneuverability of a skid steer, allows operator to position tools to accomplish task safely and efficiently.

17 Claims, 9 Drawing Sheets

(56) References Cited

U.S. PATENT DOCUMENTS

| | | |
|---|---|---|
| 5,560,129 A | 10/1996 | Rothbart |
| 5,570,897 A | 11/1996 | Wass |
| 5,833,008 A | 11/1998 | Reed |
| 6,067,733 A | 5/2000 | Gasper |
| 6,249,995 B1 | 6/2001 | Bush |
| 6,401,831 B2 | 6/2002 | Bouchard |
| 6,487,799 B2 | 12/2002 | Burk |
| 6,493,967 B2 | 12/2002 | Holmes |
| 6,523,284 B1 | 2/2003 | Clugston |
| 6,523,619 B1 | 2/2003 | Cherry |
| 6,578,295 B1 | 6/2003 | McPherson |
| 6,578,297 B1 | 6/2003 | Forsberg |
| 6,662,479 B2 | 12/2003 | Chaney |
| 6,830,211 B2 | 12/2004 | Sloan |
| 6,962,210 B1 | 11/2005 | Redenius |
| 7,185,880 B1 | 3/2007 | McCray |
| 7,243,690 B1 | 7/2007 | Price |
| 7,695,214 B2 | 4/2010 | Mailand |
| 7,779,562 B1 | 8/2010 | Loveless et al. |
| 7,823,903 B2 | 11/2010 | Swaggert |
| 8,001,708 B1 | 8/2011 | Reed |
| 8,418,777 B1 | 4/2013 | Grossen |
| 8,561,325 B1 | 10/2013 | Hegener |
| 8,596,901 B1 | 12/2013 | Popp |

\* cited by examiner

LOADER TOOLBAR AND METHOD OF USE

CROSS-REFERENCE TO RELATED APPLICATIONS

This application claims priority to U.S. provisional patent application No. 61/937,326 filed on Feb. 7, 2014, which is incorporated by reference herein in its entirety.

STATEMENT REGARDING FEDERALLY SPONSORED RESEARCH

Not applicable.

BACKGROUND

The present invention, and inventive system, is a new and novel apparatus that accommodates the easy attachment of an array of tools to a tool bar which attaches to front end loaders, skid loaders and other equipment. In some embodiments of the present invention the tools may include, a tree extractor, shovel, boom, rock pick, bale spear, universal hitch, and/or a T-Post puller.

Because of the inherent utility and maneuverability, front end loaders, skid steer loaders, track steer loaders, tractors and other heavy equipment can be used for many agricultural and construction tasks in addition to loading materials. Many of these additional applications require specialized tools some of which are attached to the bucket and others which attach directly to loader in place of a bucket. Some prior art inventions are designed for specific tasks only and do not allow for pinning an array of different tools using multiple pins to a common tool bar that interfaces to loaders, such as those found in the present invention.

Some prior art pieces that are in the same field as the present invention, but are readily distinguished from the present invention include the following. One such piece is U.S. Pat. No. 8,596,901 B1, "Universal Attachment Device for Machinery" to Howard C. Popp, Dec. 3, 2013 ("Popp"). One of the main distinctions between Popp and the present invention is the attachment mechanism in both devices. Popp uses a sliding pin, or bolts, and an attachment sleeve to attach an ice spade or forage fork to a loader, whereas the present invention utilizes high strength pins through DOM (Drawn Over Mandrels)—thick wall tubing—and bushing in the bar to withstand the heavy loads imposed on the tools and tool bar. If the bolts and/or pins illustrated in the Popp patent are subjected to the loads that accessories such as ground engaging tools, tree extractors, shovels, and rock pick of the present invention—the pins and bolts of Popp will bend or wear excessively. Also the holes which the pins or bolts are engaged in Popp will be wallowed, enlarged and elongated. Furthermore in Popp, it is not clear if the bolts and or pins support the load imposed on the beam by the accessory (tool) or just prevents the attachment sleeve from disengaging the tool bar. If they do not support the load then the attachment sleeve must fit snugly and be designed so dirt and debris do not collect and freeze up the sleeve. If the fit in Popp is not good then tool will move excessively creating excessive wear and clogging with dirt.

In one embodiment of the present invention, the high strength pins of the present invention support the load of the tool and they are engaged through thick wall tubing (DOM) and bushings welded in the holes of the tool bar to distribute the load over a larger area. Popp also fails to disclose the proprietary tool of one embodiment of the present invention referenced as the "Extractor." As used in this application, the "extractor" is a tool used to pull or extract trees.

The present invention is further distinguished from Popp for several reasons. In some embodiments of the present invention, the box frame which is attached to the back bracket not only helps to support the tool bar and tools attached to it, it is also is a carrier and can be used to transport materials including addition tools. The invention as disclosed in Popp cannot transport or carry materials. The box of the present invention also enhances some of the tools that are attached to it. By way of example, in some embodiments of the present invention a T post puller tool—box can be used to transport the post or wire being used to build or tear down fence. In some embodiments of the present invention, the box can carry additional tools to the job site, which the invention of Popp cannot do.

In some embodiments of the present invention, the box has a fulcrum or pivot built into the leading bottom edge. This fulcrum is used to gain mechanical advantage when using ground engaging tools such as the tree extractor. The fulcrum provides a pry point when for example pulling trees by transmitting some of the loaders (skid steer) weight to the tool bit enhancing the hydraulics when curling the bucket to pull the tree by its roots. This fulcrum is also used to help when prying up rocks with our rock pick tool. The fulcrum can also be used when using the shovel and as a blade to scrape dirt back into the hole or ditch to level surface. The invention of Popp lacks the fulcrum feature. Popp cannot transport anything because it does not contain a box with sides and bottom as is found in the present invention.

In some embodiments of the present invention, the top link is built into the box frame and is used for material moving functions in addition to providing additional strength and durability. In some embodiments, it is also used to strengthen and enhance the boom tool used to lift weights. By using the top link to provide an additional tensile member the boom can be made lighter and easier to attach to. In some embodiments, the top link can be removed if it impends carrying some materials in the box. The invention of Popp lacks this feature.

In some embodiments of the present invention, the box is designed to accommodate visibility when using some of the tools. A window or port is cut out in the bottom of the box to provide views of the tools when engaging the ground. In some embodiments, there is also visibility between the beams and back bracket Popp does not provide visibility especially for ground engaging tools—the Ice breaker of Popp, may be construed as ground engaging but does not enter the ground. Popp's base platform (120) with its back surface 120b and front surface 120, along with top edge and bottom edge impedes visibility when placing or orientating the tool. In some embodiments of the present invention, the box frame assembly has corner post built in to accommodate a brush guard which catches and prevent trees and limbs that are pulled, or broken off, when pulling trees from hitting the cab of the loader. The brush guard can also be used to secure materials that are stacked on the box. In some embodiments of the present invention, attaching and removing our tools to tool bar is quicker and more durable than Popp.

In some embodiments of the present invention, the present invention does not require welding a bracket to the bucket or other modifications to the equipment. The Popp tool bar is very limited in what tool can be attached due to its visibility impediment and lack of strength and durability. The Popp attaching apparatus is very limited in that its sleeve will fill with debris and its locking mechanism uses bolts and a sliding pin(s) that require precise fits. Popp also does not have a box or frame where it can be used to transport materials. Popp does not employ a fulcrum for mechanical advantage for prying or lifting need for ground engaging tools. In several embodiments, the present invention has a square tube on the bottom front of tool bar that may be used as a drag to pull soil back into the hole where the extractor is used to pull trees with extractor tool or cover a ditch dug with shovel tool. In several embodiments of the present invention, one main function is the pivot point or fulcrum when prying up trees or rocks. In several embodiments of the present invention the square tube on the present invention tool bar is also a member of the box and is used to strengthen the tubes that the brush guard is installed in.

SUMMARY

In several embodiments, the apparatus in the present invention is designed to be a device from which an array of agriculture and construction tools are easily and quickly attached to any loader, skid steer or tractor front end loader using high strength steel pins. In many embodiments of the present invention, tools are pinned to the tool bar and can be installed or removed in minutes. In many embodiments of the present invention, due to its novel design the present apparatus can take advantage of the mechanical advantage of a fulcrum or pivot point for those tools such a tree extractor when prying or pulling from ground is required. In many embodiments the present invention does not rely entirely on the hydraulics of the skid steer.

In many embodiments of the present invention, the apparatus is comprised of a back bracket—loader attachment interface—to allow coupling to those loaders that meet dimension standards. In some embodiments of the present invention, two steel plates joined with braces form a main beam which is welded to the back bracket and is the main load bearing member to which all tools are pinned during use. In some embodiments of the present invention, this load bearing main beam is designed to allow for visibility by the loader operator of tools pinned to the main beam such as shovel for digging ditches and tree extractor for pulling trees.

In some embodiments of the present invention, attached to both to the back bracket interface and main beam is a box frame made of square tubing with steel plate welded to bottom of the frame. In some embodiments of the present invention, the box frame is welded to back bracket interface and main beam. In some embodiments of the present invention, the front of this frame is composed of a square tube attached perpendicularly to the bottom of the main beam and near its front end. In some embodiments of the present invention the cross tube, cross member, or square tube, can be used as a fulcrum when curling the tool bar and prying up when tools are engaged in the ground. In some embodiments of the present invention, the tube is welded on the bottom front of the box frame and to the main beam along with gussets to further strengthen the weld joint. In some embodiments of the present invention, the fulcrum not only provides a pivot point when needed but is also is used as a blade to grade surface for leveling and smoothing soil surface. In some embodiments of the present invention, the plate welded to the bottom of the box frame assists in support of the main beam and stiffening box frame and provides a bottom for the box frame to allow for hauling and transporting.

In some embodiments of the present invention, the bottom plate has an opening cut in the front to assist operator visibility of tool position when the apparatus is in near vertical position. In some embodiments of the present invention, the corner post is made of square tubes welded vertically at the front corners of the box beam provide sockets for attaching accessories such as a brush guard when using the apparatus for brush and tree removal. In some embodiments of the present invention, the corner posts also make up the box frame and assist in securing materials when hauling and transporting items in the box.

In some embodiments of the present invention, a top link is attached to the top middle of the back bracket and to the near front of the main beam. In some embodiments of the present invention, the top link provides additional bracing for main beam. In some embodiments of present invention, the top link is also used for attaching different tools. In some embodiments of the present invention, the top link is pinned to the back bracket and main beam using steel pins and is removable.

In some embodiments of the present invention, the present invention comprises an apparatus that attaches to all loaders with industry compliant specifications, or other compliant dimensions, and configuration that comprises of a tool bar that tools and accessories are attached using multiple steel pins. In several embodiments of the present invention, the present invention comprises an attachment assembly with: a back bracket that securely attaches to compliant loader interfaces; a main beam made of steel plates and braces that are welded to back bracket and supports tools which are pinned to main beam equipped with bushings to receive high strength steel pins; a box frame with bottom plate welded to it and attached to back bracket and main frame that helps to provide rigidity and support to main frame and corner post sockets; a front bottom of box frame is composed of a square tube that is attached perpendicular to main frame and is used as a fulcrum when using ground engaging tools on the tool bar; a post socket which makes up the front corners of the box frame and provide for attaching additional accessories; and a top link provides addition support to front of main frame under heavy lifting vertical loads and attachment for specific tools.

In several embodiments of the present invention, that present invention comprises an apparatus that attaches to loaders comprising: a back bracket that attaches to loader interfaces; a main beam that is mechanically attached to said back bracket; a box frame, said box frame further comprising a bottom plate, that is attached to said back bracket, and a front bottom; said front bottom further comprising gussets that are attached perpendicular to said bottom plate; said box frame further comprising two front corner posts with post sockets on the tops of the front corner posts that are adjacent to said braces; a top link attached to said main beam and said back bracket; and wherein said main beam has a front end to mechanically attach to a mechanical accessory.

In several embodiments of the present invention, said back bracket comprises: a top brace and a bottom brace that are parallel to each other; angle irons attached to both ends of said top brace and said bottom brace forming a frame; and said bottom brace is welded to said angle irons and said box frame. In several embodiments of the present invention the invention further comprises said back bracket is welded to, and supports, said main beam. In several embodiments of the present invention the invention further comprises said main beam further comprises; two metal plates with welded braces; said welded braces are welded between said two metal plates supporting the spacing between said two metal plates; bushings welded in the front end of said two metal plates; cut-out sockets on said two metal plates that receive said top bracing of said back bracket to lock in and provide greater attachment strength for said main beam to said back bracket. In several embodiments of the present invention the invention further comprises said main beam further comprises; said main beam can receive a top link that pins in at the top rear end of said main beam and near the front end of said main beam. In several embodiments of the present invention the invention further comprises said box frame further comprises, braces welded to the bottom of said back bracket including braces is attached onto the lower end of said back bracket; said front corner tube further comprise sockets to receive mechanical accessories; a brace welded to the bottom of said front corner and perpendicular to said main beam.

In several embodiments of the present invention the invention further comprises said square tube welded to said bottom of said main beam can function as a fulcrum point when said apparatus is in operation. In several embodiments of the present invention the invention further comprises said square tube welded to said bottom of said main beam can function as a blade to scrape and smooth surface of soil when said apparatus is in operation. In several embodiments of the present invention the invention further comprises a plate welded to said bottom of said box frame which provides a solid surface bottom for said box frame; said bottom plate further comprises a port cut in the front of said bottom plate to allow for visibility when the apparatus is in operation. In several embodiments of the present invention the invention further comprises said corner posts help to secure materials placed in, or on, said box frame. In several embodiments of the present invention the invention further comprises said corner post can have a varying height that can be increased by inserting longer pipe or tubing into said corner post sockets. In several embodiments of the present invention the invention further comprises said corner posts are constructed with threaded nuts to allow for clamping and securing mechanical accessories. In several embodiments of the present invention the invention further comprises said mechanical accessory is a tree extractor. In several embodiments of the present invention the invention further comprises said mechanical accessory is a shovel. Other accessories that can be attached are: universal ball hitch, hay spear, boom, rock pick and T-Post puller.

In several embodiments of the present invention the invention further comprises a method for using an apparatus that attaches to loaders comprising: providing an apparatus comprising: a back bracket that attaches to loader interfaces; a main beam that is mechanically attached to said back bracket; a box frame, said box frame further comprising a bottom plate, that is attached to said back bracket, and a front bottom; said front bottom further comprising one set of gussets and one set of braces that are attached perpendicular to said bottom plate; said box frame further comprising two front corner posts with post sockets on the tops of the front corner posts that are adjacent to said braces; a top link attached to said main beam and said back bracket; attaching said main beam to a mechanical accessory; and attaching said back bracket to a loader. In several embodiments of the present invention the invention further comprising said mechanical accessory is a tree extractor. In several embodiments of the present invention the invention further comprising said mechanical accessory is a shovel.

In several embodiments, the present invention comprises: a method for constructing an apparatus that attaches to loaders comprising of major components of a back bracket; box frame, main beam. The apparatus making up these components are assembled by welding and include, back bracket, corner angle irons, top and bottom steel plates along with stiffeners, end pieces, top straps and bottom brackets. A brace is welded to the ends back frame and square tubes and making up box frame assembly. The main beams are made of component plates, middle brace, and front brace and back brace. Top link, and bushings for tool pins are welded to the plates in holes on the main beam. Top link pins connect to plates through holes. The box frame is composed of corner post, square tubes, bottom plate and top and bottom tube make up a truss to help support box frame and front of main beam. Gussets are welded at all corners of box frame including gussets welded to bottom edge of plates making up main beam and square tube which is perpendicular to the main beam. These numerous gussets including the braces alluded to provide for strengthening of the box frame and entire tool bar. The gussets help to support the high tension and torque loads imposed on the entire apparatus when using the tools such as the tree extractor, boom, shovel, rock pick, hay spear and T-post puller. Most parts may be cut using a plasma torch that is controlled by CAD, or the like. Components are clamped in jigs to make sure all dimensions are consistent. All weldments are made with apparatus clamped in jigs and templates to prevent warping and distortion. Further identification of components is detailed in description below.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

In the following description, certain details are set forth such as specific quantities, sizes, etc., so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 11th Edition, 2008. Definitions and/or interpretations should not be incorporated from other patent applications, patents, or publications, related or not, unless specifically stated in this specification or if the incorporation is necessary for maintaining validity.

One or more illustrative embodiments incorporating the invention disclosed herein are presented below. Applicants have created a revolutionary, and novel apparatus that accommodates the easy attachment of an array of tools to front end loaders and skid loaders. Tools are quickly and securely attached by high strength pins. Tools are unique and designed to be strong and durable.

In several embodiments, the present invention provides a tool bar 100 that is attached to various machines such as front end and skid steer loaders, tractors and other earth moving equipment. Different tools are designed to be compatible with tool bar are attached with multiple metal pins through bushings provided in the main beam. In many preferred embodiments, the tools attached to the tool bar 100 may impose significantly high torque loads and therefore may be designed using high strength multiple steel pins and bushings along with thick walled tubing describe as DOM (drawn over mandrel tubing).

Figure 1:
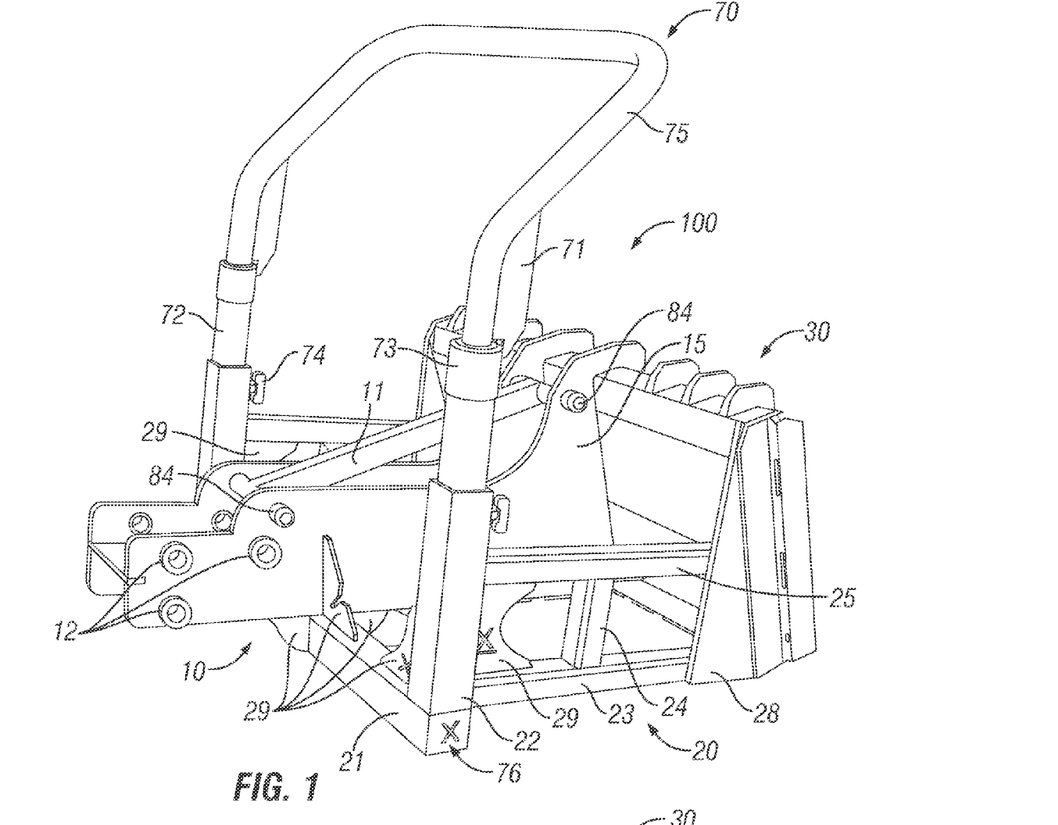
FIG. 1 illustrates an isometric view of the tool bar apparatus according to one embodiment of the present invention in assembled form with a brush guard attached.

FIG. 1 illustrates one preferred embodiments of a loader tool bar 100 in assembled view. As illustrated in FIG. 1, the loader tool bar 100 may include a back bracket assembly 30, a main beam assembly 10, and a box frame assembly 20, top link 11, corner post 22 of box frame assembly 20, and bushings 12 in main beam assembly 10. The back bracket assembly 30 attaches to the box frame assembly 20 and main beam assembly 10 at a forward angle from perpendicular. A method for constructing an exploded view illustrating the beveled edges of the mouth 403 of the bit 402 apparatus that attaches to loaders comprising of major assemblies, back bracket assembly 30 box frame assembly 20, main beam assembly 10 and brush guard 70. The parts making up these components are assembled by welding. Assembly 30, back bracket—includes corner angle irons 35 and top and bottom steel plates 34 and 37 along with stiffeners 31, end pieces 38, top straps 32 and bottom brackets 33 and 39. A brace 28 is welded to the ends back frame and square tubes 23 and 25 making up box frame assembly 20. The main beam 10 assembly is made of component plates 15, middle brace 17, and front brace 16 and back brace 18. Top link 11, and bushings 12 for tool pins 81 are welded to the plates in holes 19 on beam. Holes 61 in plates 15 are for top link pins 84.

Figure 4:
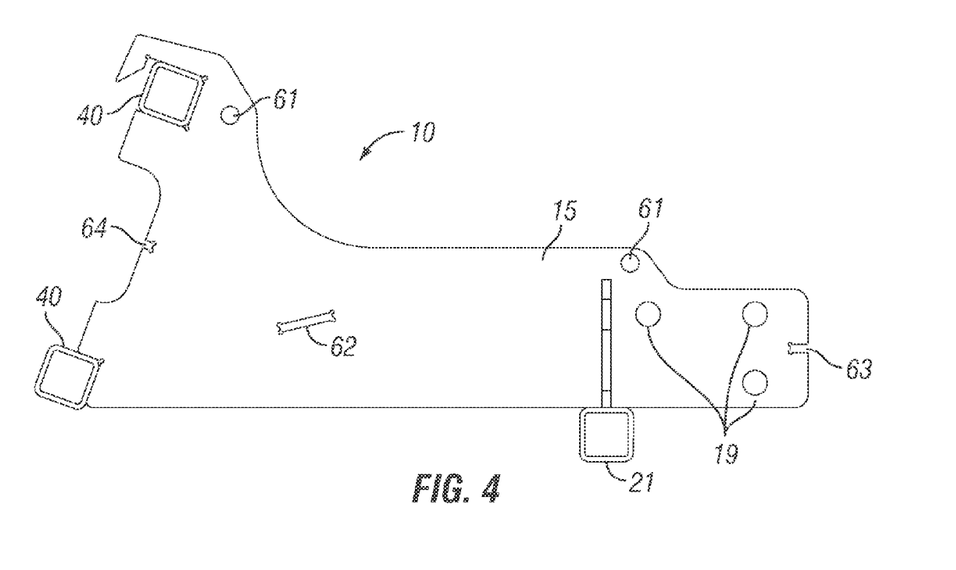
FIG. 4 illustrates a side view of plates making up the main beam of one embodiment of the present invention.

Box frame assembly is composed of corner post 22, square tubes 23 bottom and 25, top tube, and bottom plate 26 make up a truss to help support box frame and front of main beam. A vertical tube 24 located perpendicular and between tubes 23 and 25 provides additional strength and are part of a truss component of the Box frame assembly 20. Gussets 29 are welded at all corners of box frame including gussets welded to bottom edge of plates 15 making up main beam assembly 10 and square tube 21 which is perpendicular to the main beam. See also FIG. 5. These gussets including the braces alluded to provide for strengthening of the box frame and entire tool bar. Trusses, gussets and braces help to support the high tension and torques loads imposed on the entire apparatus when using the tools such as the tree extractor, boom, shovel, rock pick, hay spear and T-post puller. Most parts are cut using a plasma torch that is controlled by CAD drawings. Components are clamped in jigs to make sure all dimensions are consistent. All weldments are made with apparatus clamped in jigs and templates to prevent warping and distortion. Further identification of components are detailed in description below FIG. 1 also illustrates one embodiment of a top link 11 is pinned with top link pins 84 to the main beam assembly 10 see also FIG. 6, and back bracket assembly 30 assembly to provide additional support to the tools. In some embodiments of the present invention, the box frame assembly 20 has a fulcrum or pivot built into the bottom leading edge 21, such as shown in FIG. 4. In some embodiments of the present invention, ground penetrating tools such as the tree extractor 400, shovel 90 use the mechanical advantage of a fulcrum 21 in digging and prying. In some embodiments of the present invention, gussets 29 provide support to the corners of corner post 22 and fulcrum 21. The square tube making up the fulcrum has end caps 76, FIG. 1, welded in to prevent debris from entering tube. In some embodiments of the present invention, a brush guard 70 (which can prevent brush from entering the cab) is inserted into pipe sleeve 72 and in sockets 210 of corner post 22 of box frame assembly 20 (which can be solid sided if necessary) a part of the tool bar 100 to provide protection in the cab 201 of the loader or vehicle. See FIGS. 5 and 7. In some embodiments of the present invention, locking screws 74 are for fastening in brush guard 70. In some embodiments of the present invention, a brace 71 is welded to the brush guard to provide it additional support and strengthen from bending with large trees are being extracted. In many embodiments of the present invention, a pipe collar 73 is welded to pipe sleeve 72 to reinforce sleeve 72 when brush guard assembly 70 is inserted in socket 210 of corner post 22. See FIG. 1. In many embodiments of the present invention the brush guard 70 is comprised of a rail 75, pipe collar 73, reinforced by a brace 71 all are welded together making a guard 70 which prevents brush and trees from hitting or entering cab 201 of loader 200, FIG. 7.

Figure 2:
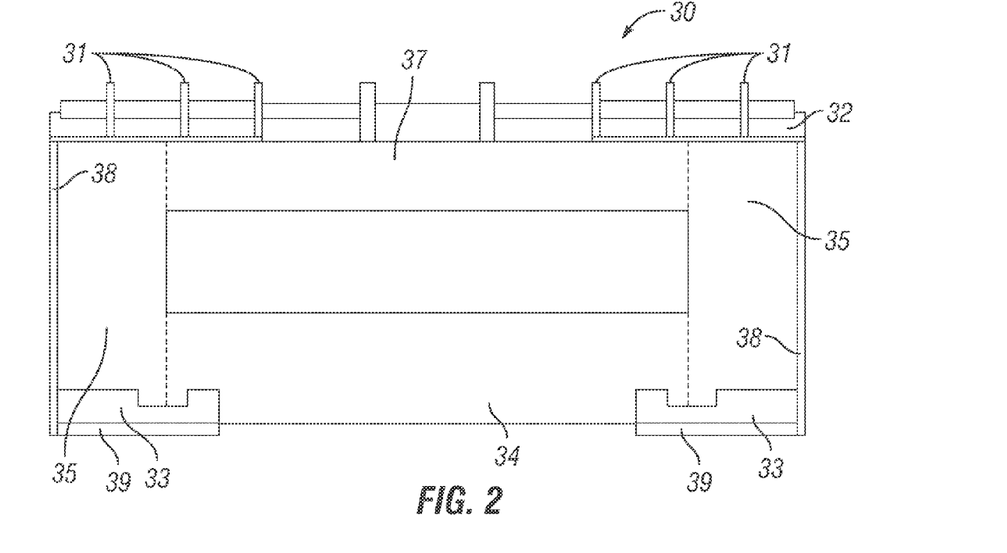
FIG. 2 illustrates a rear view comprising mostly the back bracket of one embodiment of the present invention in partially assembled form.

FIG. 2 illustrates one embodiment of a rear view of the bracket assembly 30 of one embodiment of the present invention. As shown in this embodiment, the back bracket assembly 30 is a frame composed, preferably, of a steel plate top 37 and bottom steel plate 34, angle iron corners 35, end pieces 38, two support braces 28 to the corner. Also making up the back bracket assembly 30, two top straps 32, with stiffeners 31 welded to them for support. Two bottom brackets made up of steel straps 33 and 39 with slots cut in them to receive the loader pins when coupling to loader. Two horizontal tubes 40, FIG. 5, also are components of the back bracket assembly 30.

Figure 3:
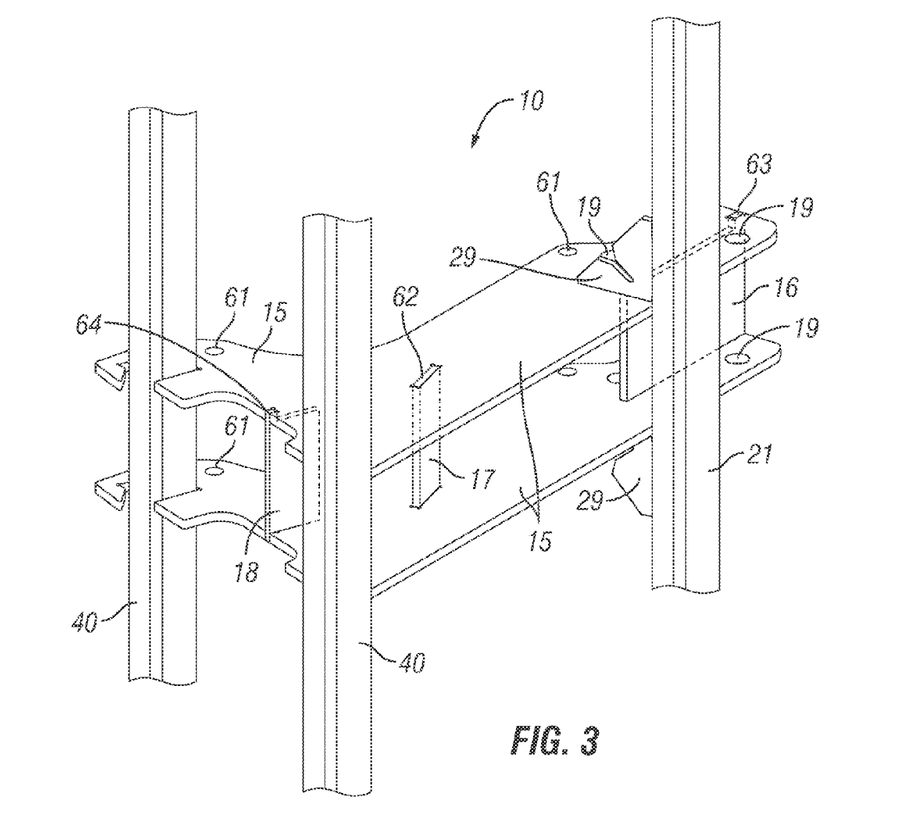
FIG. 3 illustrates a rotated view of main beam of one embodiment of the present invention in partially assembled form.

FIG. 3 illustrates an isometric view of one embodiment of the main beam assembly 10 of the present invention on its side. FIG. 3 also illustrates and two square tubes 40 which are a part of the back bracket assembly 30, shown in FIG. 2. Main beam assembly 10 is depicted on its side to illustrate components and space between the plates 15 making up the main beam assembly 10. Main beam assembly 10, in addition to heavy steel plates 15 is composed of front brace/bracket 16, middle brace 17 and back brace 18 welded to plates 15 to form a beam, for support. See FIG. 3. The space between the plates 15 making up the beam 10 also provides vision through plates 15 when looking at the beam 10 with beam in near vertical position.

In many embodiments of the present invention, the middle brace 17 is orientated so as not to obstruct view by operator when operating tool bar 100 with a tool inserted in main beam assembly 10. Visibility of the tools especially the shovel and tree extractor is very important to place the tool in the proper position for digging a ditch or pulling a tree. In many embodiments of the present invention, plates 15, making up main beam assembly 10 maybe cut out to wrap around the top and bottom square tubes 40 providing greater strength for a welded joint. In many embodiments of the present invention, both metal plates 15 have slots cut in them to receive the brace tabs of the three braces 16, 17 and 18 that are inserted in them to provide easier assembly and to provide greater strength for the weld joint. In several embodiments of the present invention tube 21 is welded to bottom and perpendicular to near front of beam 10. In many embodiments, tube 21 forms the bottom front of the box frame assembly 20, such as shown in FIG. 1. In several embodiments of the present invention, tube 21 helps to support and stiffen main beam assembly 10 and is also used as a blade for smoothing surface of soil when dragging tool bar 100 across the top of ground. In several embodiments, tube 21 also provides a fulcrum for the main beam assembly 10 when operating the tool bar 100 with tools attached for pulling trees, rocks, post and other items from the ground.

Figure 6:
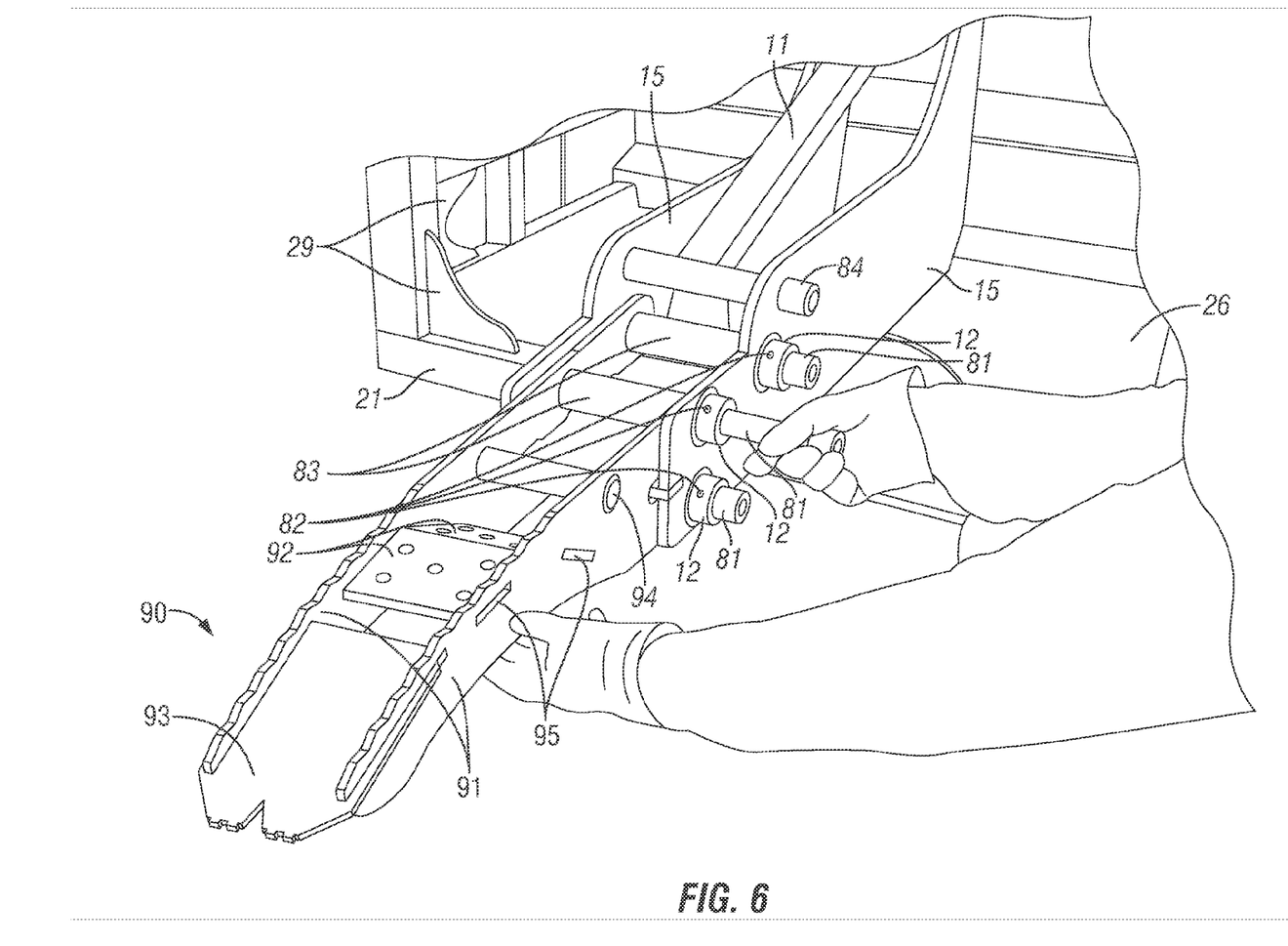
FIG. 6 illustrates attaching a shovel tool to the main beam by using metal pins on one embodiments of the present invention.

In some embodiments of the present invention, holes 19 are cut in the plates 15 making up to main beam assembly 10 to receive bushings 12 that are welded in. Bushings 12, in FIG. 1, may provide support for the steel pins 81 as shown in FIG. 6. All tools are attached to the tool bar 100 using these steel pins 81. In some embodiments of the present invention, holes 61 are cut in plates 15 to pin in top link 11, as shown in FIG. 3. In some embodiments of the present invention, slots 62, 63 and 64 are cut into the plates 15 making up the beam 10. In some embodiments of the present invention, the slots 62, 63, and 64 are used to lock in the three braces 16, 17 and 18 that are welded in to provide rigidity and support of the plates 15 making up the main beam assembly 10. These slots 62, 63 and 64 may also provide for faster and more accurate assembly of the main beam assembly 10.

FIG. 4 depicts a side elevation of one embodiment of a plate 15 that makes the main beam assembly 10 of the present invention. In many embodiments of the present invention, holes 61 are cut in plates 15 to pin in top link 11 FIG. 1. In many embodiments of the present invention, slots 62, 63 and 64 are cut into the plates 15 making up the beam assembly 10. See FIG. 3. In many embodiments of the present invention, the slots 62, 63 and 64 also provides for faster and more accurate assembly of the main beam. In many embodiments of the present invention, horizontal square tubes 40 are locked in and welded perpendicular to main beam assembly 10 and form the top and bottom of back bracket assembly 30. See FIG. 5. In many embodiments of the present invention, square tube 21 is substantially perpendicular to front end of beam assembly 10 and makes up bottom front of box frame assembly 20. Tube 21 is also used as a blade for scraping and smoothing surface of top soil. Tube 21 acts also as a pivot point or fulcrum when using the tool bar 100 for engaging tree roots, rocks, concrete slabs and other items to pry them up and extract or lift from the soil.

In many embodiments of the present invention, the top edges of plates 15 making up main beam assembly 10 are substantially equal in height, or level to top of box truss made up of square tube 25 and 23 of box frame assembly 20 as shown in FIG. 1. This allows for materials such as T post, rolls of fence wire, lumber and other construction materials to lay the box frame assembly 20 for transportation.

Figure 5:
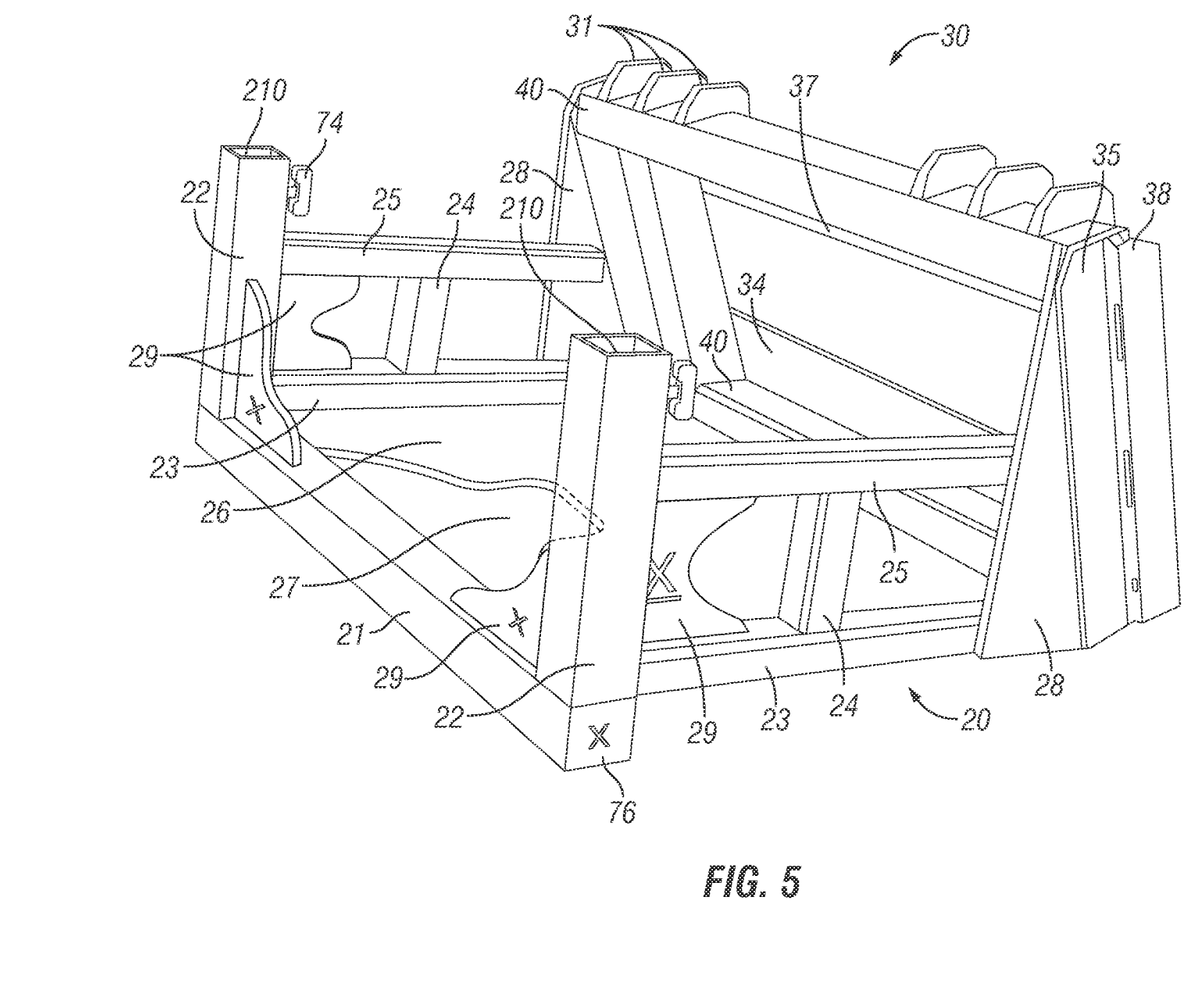
FIG. 5 illustrates an isometric view of box frame with bottom plate and back bracket of one embodiment of the present invention.

FIG. 5 illustrates one embodiment of the present invention with components making up the box frame assembly 20 assembly and back bracket assembly 30, in FIG. 2, to which it is attached. In this embodiment, top and bottom horizontal tubes 40, are part of the back bracket assembly 30 and are welded to the box frame assembly 20. In several embodiments, the side truss is made up with square tubes, top 25 and bottom 23 with vertical brace 24 provides support for the corner post 22 and square tube 21. Gussets 29 are welded in front and side corners of box frame. In some embodiments, box frame assembly 20 also provides support to the entire tool bar 100. In several embodiments, a bottom plate 26 attaches to the box frame assembly 20 providing rigidity to the frame and allows for materials to be transported in and on the box frame assembly 20. In several embodiments, the front of the bottom/floor plate 26 is cut out to provide a port 27 for visibility of attached tool when apparatus is in near vertical position to ground when engaging tools such as tree extractor and shovel. In several embodiments, the floor plate 26 along with square tube 21 also helps when grading or smoothing soil surface when several embodiments of the present. As shown in FIG. 1 gussets 29 are welded to bottom edge of plates 15 making up main beam assembly 10 where they intersect with square tube 21

Figure 9:
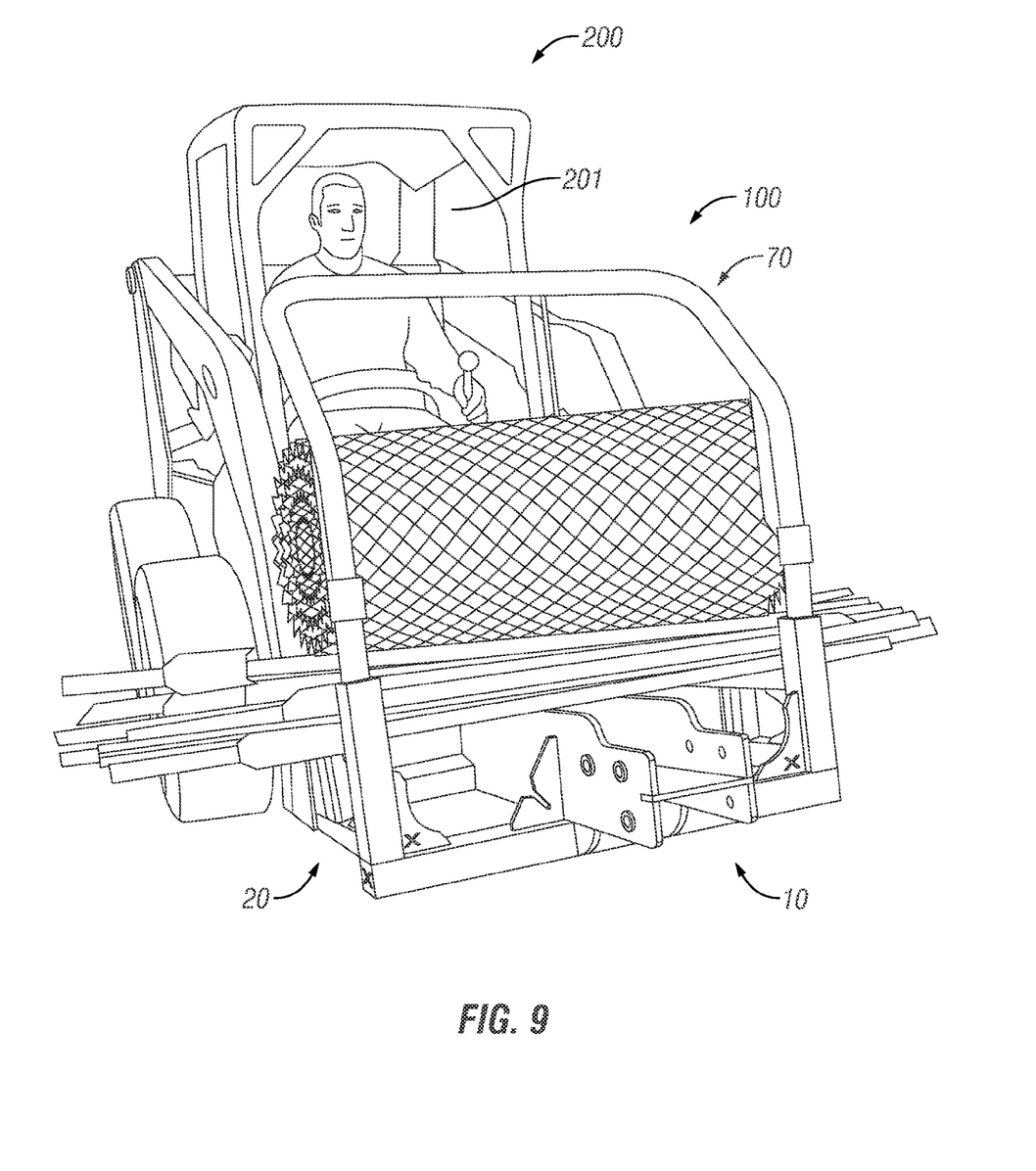
FIG. 9 illustrates using the tool bar with box frame to transport materials in one embodiments of the present invention.

In several embodiments of the present invention, top tubes 25 are approximately equal in height to top edge of main beam assembly 10 providing a platform for laying material across for transportation, see FIG. 9. In several embodiments of the present invention, brace 28 is welded to back bracket assembly 30 and to box frame assembly 20. Brace 28 reinforces the welded joint between back bracket assembly 30 and box frame assembly 20. In several embodiments, in addition to providing corner post 22 for the box frame assembly 20, the tubing making up the corner post 22 also provides for a socket 210, FIG. 5 to insert accessories such as a brush guard 70. In some embodiments of the present invention, the locking screws 74 are for fastening in brush guard 70, in socket 210.

FIG. 6 illustrates one embodiment of the present invention in which a user is attaching tools by pinning tools, as shown, a shovel tool 90 to the main beam assembly 10. The shovel tool is used to dig ditches and to pry and remove rocks, concrete and other items from the earth. The shovel tool is constructed of side rails 91, with sleeves 83 and reinforcement plates 92, and bit 93 all welded to the rails. All weldments are made with components slotted and tabbed 95 to provide additional strength and also to accomplish precise dimensions with little distortion. A handle 94 is welded in between the rails 91 to provide addition strength and stiffness and to provide a place to lift the shovel from the tool bar 100. The shovel is designed to be installed to main beam assembly 10 with steel pins 81. Shovel tool 90 can be installed with shovel pointed downward as shown in FIG. 6. When in this position the shovel is used for digging ditch by lowering and dragging it. Shovel can also be installed with shovel pointing up. In this position rocks and other materials may be lifted from the earth using the mechanical leverage gained when using the fulcrum 21 of the tool bar 100.

In some embodiments of the present invention, up to three pins 81 may be used to attach different tools to the tool bar 100, although it is envisioned that less than three pins 81 can be used in some embodiments of the present invention. In several embodiments of the present invention, bushings 12 are welded in the plates 15 part of the main beam assembly 10 to provide additional support to the pins 81. In some embodiments of the present invention, pins 81 are supported in the different tools by sleeves 83. These sleeves are made from thick wall DOM (drawn over mandrel) round tubes In several embodiments, pins are locked in bushings 12 with bolts and locking nuts that are inserted into the holes 82 drilled into the bushing 12. In some cases pins may be locked in the bushings by using spring locking pins. In several embodiments of the present invention, top link 11 is also pinned with top link pins 84 to the plates 15 of main beam assembly 10 and back bracket assembly 30 to provide additional support to the tools. The top link 11 adds tensile strength when using the boom in the universal tool. In some embodiments of the present invention, ground penetrating tools such as the shovel 90 use the mechanical advantage of a fulcrum 21 in digging and prying actions. In some embodiments, gusset 29 provide support to the corner posts 22 and fulcrum 21. Gussets 29 provide additional strength to the welded joints.

Figure 7:
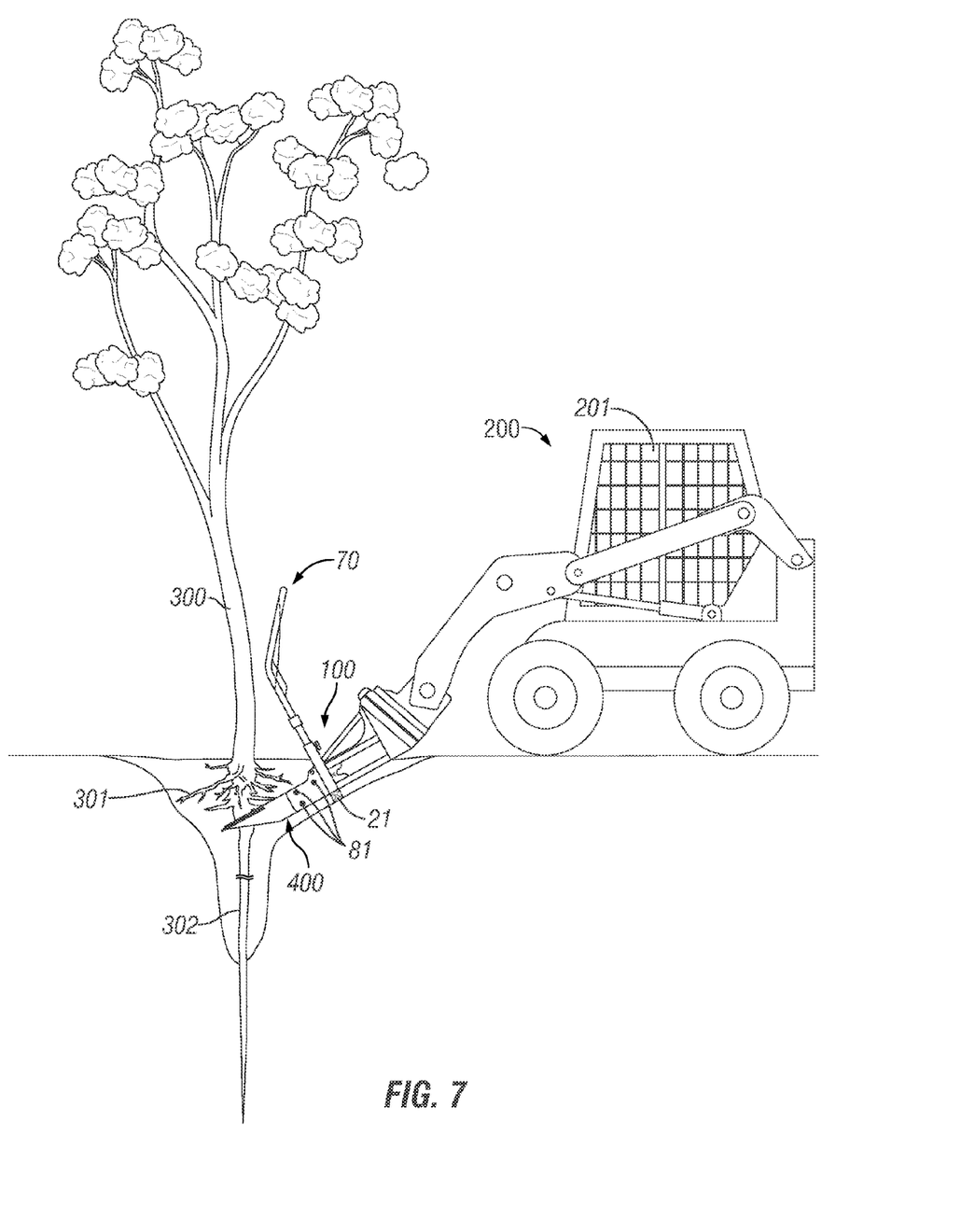
FIG. 7 illustrates using tree extractor tool pinned to tool bar on one embodiment of the present invention.

FIG. 7 illustrates one embodiment of the invention using the tool bar 100 attached to a skid steer 200 with a tree puller tool 400 utilizing steel pins 81 to the tool bar 100 to pull tree or brush 300. In this embodiment, fulcrum 21 is being used to provide additional mechanical leverage to pry up on tool bar 100 increasing the hydraulic lift capacity of the skid steer 200. In this embodiment, a brush guard 70 is inserted into pipe sleeve 72 and corner post 22 of box frame assembly 20 a part of the tool bar 100 to provide protection from the tree coming into the cab 201 of the skid steer 200. See FIG. 1. In this embodiment of the present invention, a brace 71 is welded to the brush guard 70 to provide it additional support and strengthen from bending when large trees are being extracted.

Figure 8:
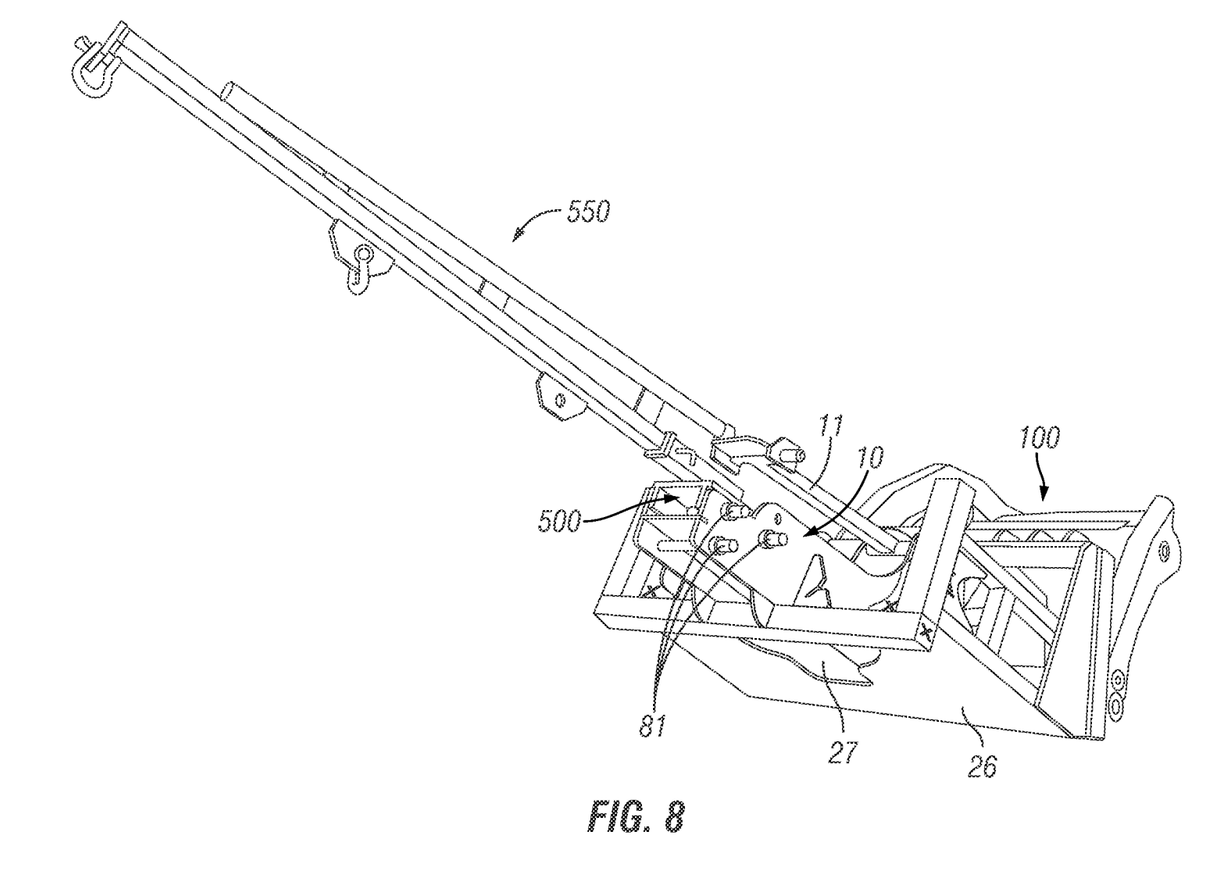
FIG. 8 illustrates in general a boom pinned to the tool bar using universal hitch of one embodiment of the present invention.

FIG. 8 illustrates one embodiment of an attachment of the present invention (from a lower angle of) a boom, 550 attached with pins 81 to a universal hitch tool 500. Boom 550 may be used to lift weight using devises at different lengths along the boom. Boom 550 is pinned to the top link 11 to provide additional vertical support for the boom. Top Link also helps to provide additional support and stiffening when using the tool bar with ground engaging tools that impart vertical and twisting loads to the main beam assembly 10

Figure 10:
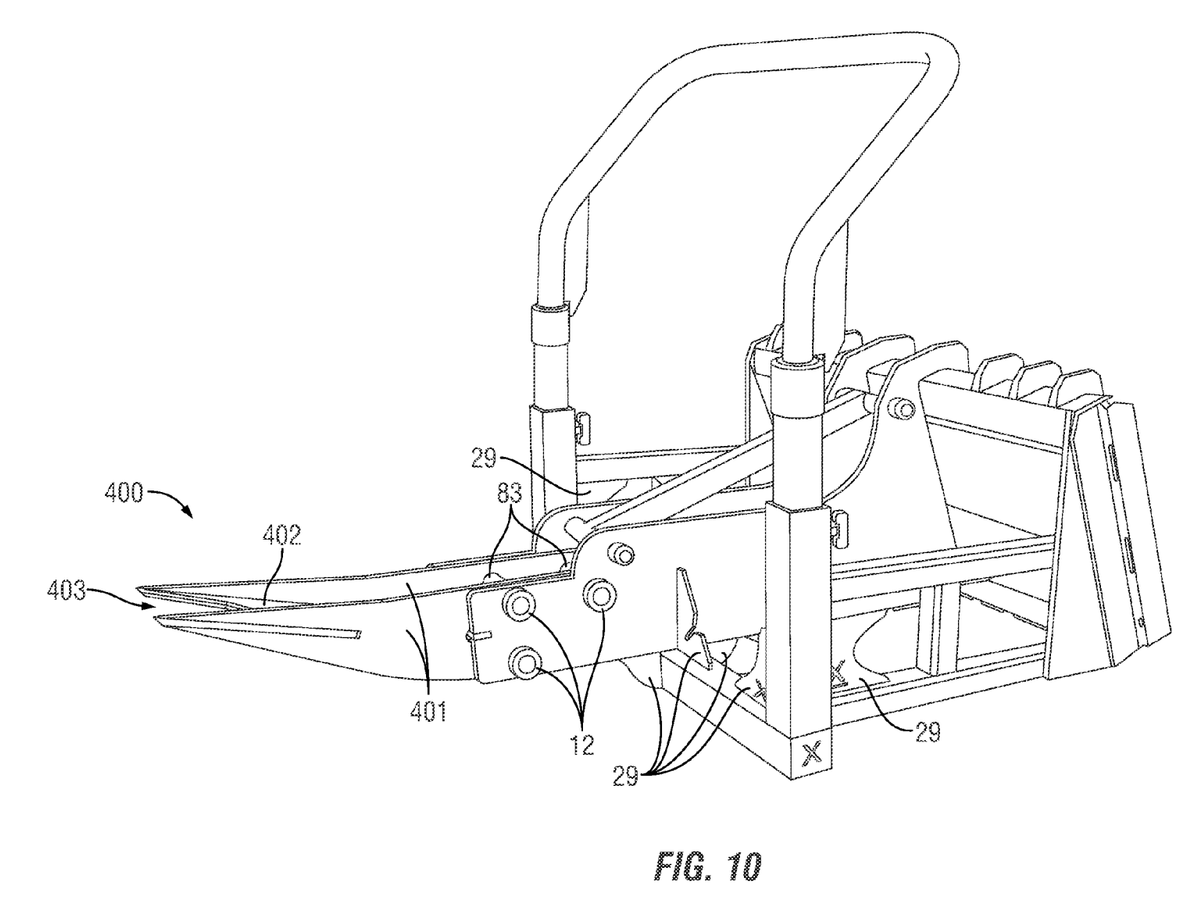
FIG. 10 illustrates the extractor tool pinned to the tool bar of one embodiment of the present invention.

FIG. 9 illustrates one embodiment of the present invention using the tool bar 100 with brush guard 70 to transport materials such as a T-Post and roll of wire. Brush guard 70 can be removed if not needed. If tool bar is being used to transport materials that are laying perpendicular to the main beam assembly 10 it would be advantageous to remove top link FIG. 10 illustrates the tree extractor of one embodiment of the present invention. The tree extractor 400 tool attaches easily and quickly to the tool bar main beam assembly 10 with three pins. In preferred embodiments, the tree extractor 400 is designed to penetrate beneath the root ball of most trees with tap roots so the tree is pulled by its roots. In many embodiments, the tree extractor 400 design takes advantage of the fulcrum 21 built into the tool bar. Curvature of side rails and inclined angle of bit also helps to pry out the tree. In many preferred embodiments, the tree extractor 400, is rugged and durable and is designed to provide self-cleaning and visibility when pulling trees. Mesquite trees and others will not regenerate if they are pulled by their tap roots beneath the root ball. Most all other trees removing tools grub out the tree and roots leaving a large hole. Most all other tree removing tools also cut the tap root instead of pulling it. In many preferred embodiments, tree extractor 400 is designed to get adequate penetration even in hard dry soils, under the root ball—approximately 18 inched deep in most applications, using small to medium sized loaders. In some preferred embodiments, the tree extractor 400 is modular in design which allows efficient manufacturability. The two primary parts of the extractor 400 are the side rails 401 and bit 402. These are locked together using slots and tabs to provide accurate and strong construction. They also accommodate easy and accurate welded joints. Per FIG. 7, the bits mouth 403 is designed to penetrate beneath the root ball 301 and around the tap root 302. The mouth 403 of the bit 402 has bevelled edges FIG. 12. It is bevelled similar to chisel to enhance the grabbing of the root. It is not sharp in that there is a bull nose, FIG. 12, on the top edge of the bevel. This prevents from cutting the root and only allows it to grab the root. In several embodiments of the present invention, the present invention utilizes a square tube 21 on the bottom front of tool bar 100 that is used as a drag to pull soil back into the hole when trees are pulled with the extractor tool or to cover a ditch dug with the shovel tool. See FIG. 1. The main function of the square tube 21 though is the pivot point or fulcrum when prying up items such as trees, rocks, or other large items. The square tube 21 on several embodiment of the present invention is welded to the tool bar is also a member of the box frame assembly 20 and is used to strengthen the corner posts 22 when they have the brush guard 70 inserted. Tool bar as shown in exploded view illustrates the assemblies comprising main bean assembly 10, box frame assembly 20, back bracket assembly 30 and brush guard 70. One of the tools tree extractor 400 that pins to the tool bar is also depicted.

Figure 11:
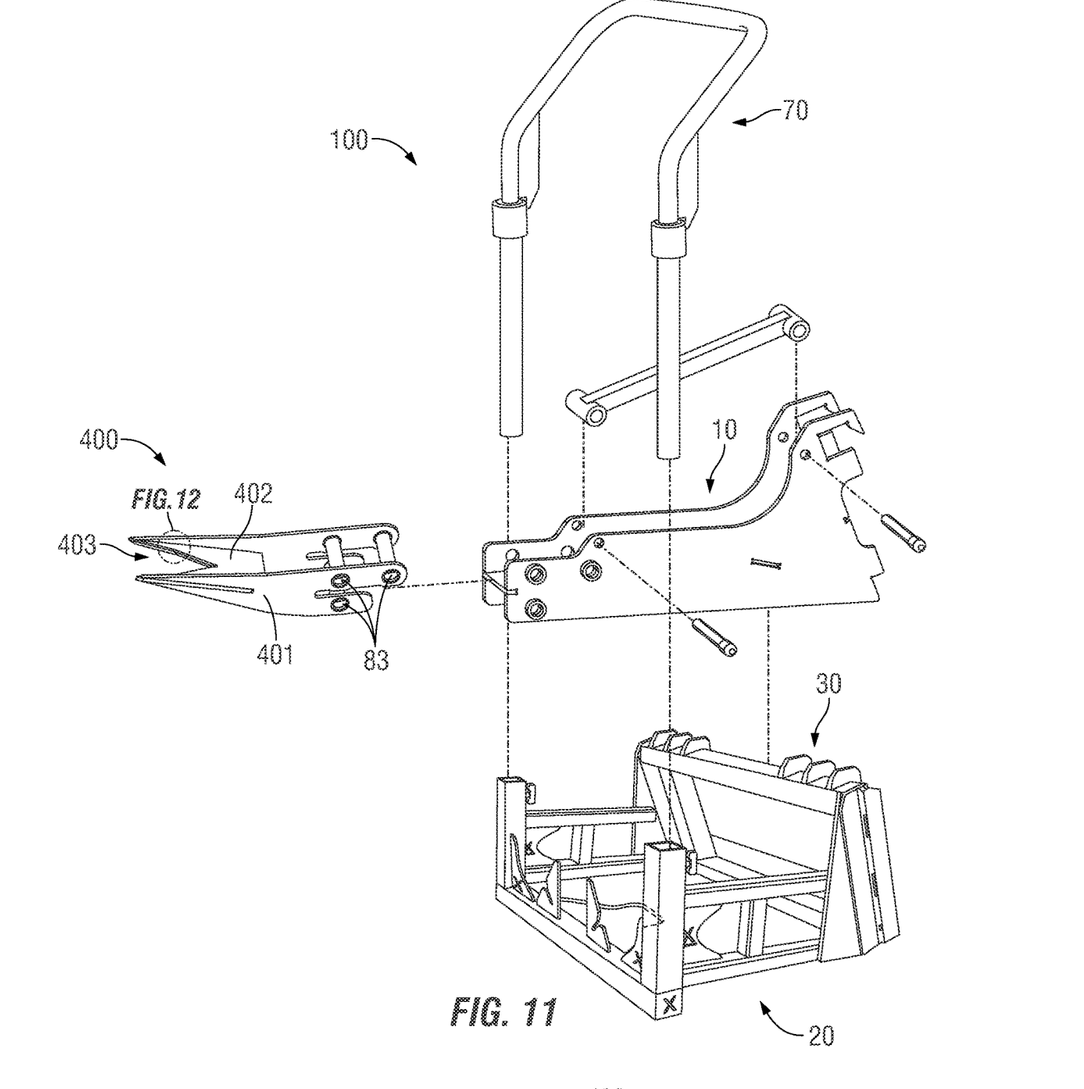
FIG. 11 illustrates an exploded view of the tool bar apparatus according to one embodiment of the present invention.

FIG. 11 illustrates an exploded view of the tool bar apparatus according to one embodiment of the present invention. Assembly of major components of the tool bar 100 is enhanced by close fits of all joints using CAD drawings and dimensions that dictate the plasma cuts and in most cases slots and tabs for example 62, 63, 64, for locking them in for welding. Also see FIG. 3. Tools, tree extractor 400 and shovel 90 are constructed also with slots and tabs to enhance the locking of parts together. All critical weld joints are reinforced with gussets 29. The top end of the beam plates 15 making up the main beam assembly 10 are cut out to allow the plates 15 to lock around the horizontal tubes 40 that make up the primary components of the back bracket assembly 30. To add additional strength for high torques loads a top link 11 is installed in the top and bottom holes 61 of the beam assembly 10. See also FIG. 1. To also support the high torque loads, stiffeners 31 are welded to the top straps 32 and top horizontal tube 40 which make up the back bracket. See also FIG. 5. Addition support is provided to the back bracket assembly 30 by a top plate 37 and a bottom plate 34. Heavy angle iron corners 35 serve as additional support for the top and bottom tubes 40 of the back bracket assembly 30. Brace 28 is welded to angle iron corners 35 and horizontal square tubes 23 and 25 which make up a truss for the box frame assembly 20. Braces 28 gussets 29 and brackets are also used throughout the tool bar 100 to increase the strength of major stress points. Bushings 12 are cut and turned with metal lath from heavy thick walled round tubes referred to as DOM (Drawn over mandrels) are used to increase the wear point surface areas for all pins. See FIG. 1. These bushings 12 are welded into holes 19 in the plates 15 making up the main beam assembly 10. See. FIG. 4. Heavy walled DOM sleeves 83 are welded in all tools for the high strength pins 81 to pass through when engaging the bushings 12 welded in the holes 19 of the plates 15 which make up the main beam assembly 10. A thick bottom plate 26 is welded to the bottom members of the back bracket assembly 30, box frame assembly 20 and main beam assembly 10 to future strengthen and stiffen the tool bar 100. All components are placed in jigs for assembling. This provides for consistency and trueness.

Figure 12:
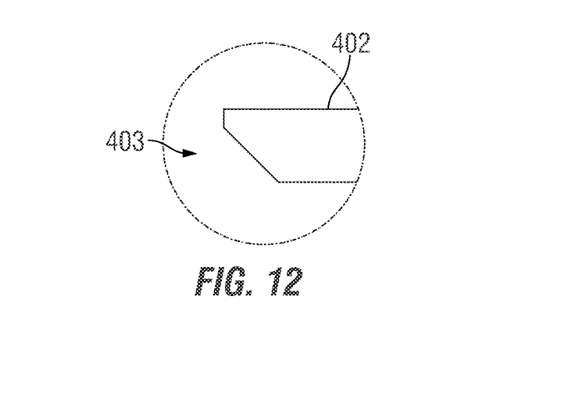
FIG. 12 illustrates an exploded view illustrating the beveled edges of the mouth of the bit of the extractor tool in one embodiment of the present invention.

FIG. 12 an exploded view illustrating the beveled edges of the mouth 403 of the bit 402. Bevel is bull nosed so bit will not cut the root. Mouth 402 is designed with bevel and bull nose so extractor tool 400 will engage tree root 302 beneath root ball 301 to pull tree and not cut the root. The mechanical leverage is achieved by pivoting and rotating the tool bar 100 over the fulcrum 21 while prying up on the tree.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed is the following:

1. An apparatus that attaches to loaders including skid steer and front end and articulated loaders comprising:
   a back bracket that attaches to loader interfaces;
   a main beam that is mechanically attached to said back bracket;
   a box frame,
   said box frame further comprising a bottom plate that is attached to said back bracket, a front bottom, and two front corner posts;
   said box frame further comprising trusses made up of parallel tubes with vertical brace tube that are attached between the back bracket and the corner posts;
   said front bottom further comprising gussets that are attached perpendicular to said bottom plate;
   said two front corner posts further comprising post sockets on the tops of the front corner posts that are adjacent to said gussets;
   a top link attached to said main bean and said back bracket; and
   wherein said main beam has a front end to mechanically attach to a mechanical accessory tool.

2. The apparatus of claim 1 further comprising;
   said back bracket comprises:
   a top tube and a bottom tube that are parallel to each other;
   angle irons attached to both ends of said top tube and said bottom tube forming a frame; and
   said bottom tube is welded to said angle irons and said box frame.

3. The apparatus of claim 2 further comprising;
   said back bracket is welded to, and supports, said main beam.

4. The apparatus of claim 1 wherein said main beam further comprises;
   two metal plates with welded braces;
   said welded braces are welded between said two metal plates supporting the spacing between said two metal plates;
   bushings welded in the front end of said two metal plates;
   cut-out sockets on said two metal plates that receive said top bracing of said back bracket to lock in and provide greater attachment strength for said main beam to said back bracket.

5. The apparatus of claim 4 wherein said main beam further comprises;
   said main beam can receive a top link that pins in at the top rear end of said main beam and near the front end of said main beam.

6. The apparatus of claim 1 further comprising;
   said box frame further comprises,
   square tubes welded to the bottom of said back bracket including one tube attached onto the lower end of said back bracket;
   said front corner posts further comprise sockets to receive mechanical accessories;
   a square tube welded to the bottom of said front corner posts and perpendicular to said main beam.

7. The apparatus of claim 6 further comprising;
   said square tube welded to said bottom of said main beam can function as a fulcrum point when said apparatus is in operation.

8. The apparatus of claim 6 further comprising;
   said square tube welded to said bottom of said back bracket is also welded to the bottom of said main beam and can function as a blade to scrape and smooth surface of soil when said apparatus is in operation.

9. The apparatus of claim 6 further comprising;
   said bottom plate is welded to said trusses which provides a solid surface bottom for said box frame;
   said bottom plate further comprises a port cut in the front of said bottom plate to allow for visibility when the apparatus is in operation.

10. The apparatus of claim 9 further comprising;
    said corner posts help to secure materials placed in, or on, said box frame.

11. The apparatus of claim 10 wherein;
    said corner posts can have a varying height that can be increased by inserting longer pipe or tubing into said corner post sockets.

12. The apparatus of claim 10 wherein;
    said corner posts are constructed with threaded nuts to allow for clamping and securing mechanical accessories.

13. The apparatus of claim 1 further comprising;
    said mechanical accessory is a tree extractor.

14. The apparatus of claim 1 further comprising;
    said mechanical accessory may include members selected from the group consisting of a shovel, a boom, a hay spear, a rock pick, or a T-post puller universal hitch.

15. A method for using an apparatus that attaches to loaders comprising:
    providing an apparatus comprising:
    a back bracket that attaches to loader interfaces;
    a main beam that is mechanically attached to said back bracket;
    a box frame,
    said box frame comprising a bottom plate, a front bottom, and front corner posts; wherein the bottom plate is attached to said back bracket and the corner posts are attached to the front bottom;

said front bottom further comprising a set of gussets that are attached perpendicular to said bottom plate;

said box frame further comprising top and bottom parallel tubes with vertical tube brace forming a truss is attached to said back bracket and said front corner posts;

said two front corner posts further comprise post sockets on the tops of the front corner posts that are adjacent to said tubes and gussets;

a top link attached to said main beam and said back bracket;

attaching said main beam to a mechanical accessory; and attaching said back bracket to a loader.

16. The method of claim 15 further comprising;
said mechanical accessory is a tree extractor.

17. The method of claim 15 further comprising;
said mechanical accessory is a shovel.

\* \* \* \* \*